(12) United States Patent
Ashton et al.

(10) Patent No.: US 7,613,946 B2
(45) Date of Patent: Nov. 3, 2009

(54) APPARATUS, SYSTEM, AND METHOD FOR RECOVERING A MULTIVOLUME DATA SET

(75) Inventors: Lyn Lequam Ashton, Tucson, AZ (US); John Glenn Thompson, Tucson, AZ (US); Henry Verdugo Valenzuela, Tucson, AZ (US); Glenn Randle Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 11/531,857

(22) Filed: Sep. 14, 2006

(65) Prior Publication Data

US 2008/0126723 A1    May 29, 2008

(51) Int. Cl.
    *G06F 11/00* (2006.01)
(52) U.S. Cl. .................. 714/6; 714/15; 714/21
(58) Field of Classification Search .......... 714/6, 714/15, 21
    See application file for complete search history.

(56) References Cited

U.S. PATENT DOCUMENTS

| 6,542,972 | B2 | 4/2003 | Evers et al. | 711/162 |
|---|---|---|---|---|
| 6,732,124 | B1 | 5/2004 | Koseki et al. | 707/202 |
| 6,760,823 | B1 | 7/2004 | Schutzman | 711/162 |
| 6,880,102 | B1 | 4/2005 | Bridge | 714/6 |
| 6,883,073 | B2 | 4/2005 | Arakawa et al. | 711/162 |
| 7,360,113 | B2 * | 4/2008 | Anderson et al. | 714/5 |
| 2003/0236956 | A1 | 12/2003 | Grubbs et al. | 711/192 |
| 2005/0010620 | A1 | 1/2005 | Silvers et al. | 707/205 |
| 2005/0108485 | A1 | 5/2005 | Perego | 711/162 |
| 2005/0216681 | A1 | 9/2005 | Micka et al. | 711/162 |
| 2005/0246401 | A1 | 11/2005 | Edwards et al. | 707/205 |
| 2006/0248295 | A1 * | 11/2006 | Uchiyama et al. | 711/162 |

* cited by examiner

Primary Examiner—Robert Beausoliel
Assistant Examiner—Charles Ehne
(74) *Attorney, Agent, or Firm*—Kunzler & McKenzie

(57) ABSTRACT

An apparatus, system, and method are disclosed for recovering multivolume data. In one embodiment, a backup module physically backs up a plurality of source volumes to plurality of backup volumes. A data set size module may also capture a data set size for a data set during the physical backup. A retrieval module retrieves metadata for the data set from a catalog. A location module locates the data set on the plurality of backup volumes using the metadata. A recovery module recovers the data set as a recovered data set from the plurality of backup volumes. In one embodiment, a verification module verifies that the recovered data set is successfully recovered.

20 Claims, 6 Drawing Sheets

APPARATUS, SYSTEM, AND METHOD FOR RECOVERING A MULTIVOLUME DATA SET

FIELD OF THE INVENTION

This invention relates to recovering data sets and more particularly relates to recovering multivolume data sets.

DESCRIPTION OF THE RELATED ART

Data processing systems often store significant quantities of valuable data. For example, data processing systems may store transaction data, inventory data, customer service configurations, account information, and the like. The data may be stored as a plurality of data sets across one or more physical storage volumes, referred to herein as source volumes. A data set may be a file, a data base, and/or other logical organization of data.

The data sets may be critical to an organization employing the data processing system. As a result, data sets are typically copied to protect against loss. The data processing system may copy a data set to one or more backup physical storage volumes to back up the data set. The backup physical storage volumes are referred to herein as backup volumes.

Data is best protected by frequently making backup copies, referred to herein as backing up, to minimize the potential for data loss. Unfortunately, backing up data sets consumes data processing system bandwidth. Therefore, backup operations should ideally be both fast and frequent to reduce their impact on the data processing system.

Data is typically backed up using a logical backup or using a physical backup. In a logical back up, the data processing system backs up data sets and captures the data sets' associated metadata to the backup volumes. The metadata specifies characteristics of the data sets on a physical volume. The metadata for the source volumes specifies the locations of the data sets on the source volumes along with characteristics of the data sets. Metadata may also be captured for the backup volumes and stored in an inventory data set. The captured metadata for the data sets on the backup volumes are thus available to locate and recover a data set from the backup volumes. Unfortunately, the logical back up requires significant data processing system bandwidth, as the metadata must be captured and organized.

In contrast, the data processing system using a physical backup blindly copies data blocks from the source volumes to the backup volumes when using a physical back up, making the backup volumes physically equivalent to the source volumes. The physical backup may be performed much more rapidly than the logical backup, reducing the impact on the data processing system.

Unfortunately, the physical backup does not capture the metadata for the backed up data sets. As a result, the data processing system may not have the needed information to recover a single data set that is stored from the backup volumes to target physical volumes. Target physical volumes are referred to herein as target volumes. In particular, the data processing system may lack the information to recover a data set that is stored on multiple storage volumes. A data set that is stored on multiple storage volumes is referred to herein as a multivolume data set.

SUMMARY OF THE INVENTION

From the foregoing discussion, there is a need for an apparatus, system, and method that recover a data set from backup volumes without backup volume metadata for the data set. Beneficially, such an apparatus, system, and method would allow the recovery of the data set if the data set is backed up using the increased performance of a physical backup without capturing metadata for the data set.

The present invention has been developed in response to the present state of the art, and in particular, in response to the problems and needs in the art that have not yet been fully solved by currently available data recovery methods. Accordingly, the present invention has been developed to provide an apparatus, system, and method for recovering multivolume data that overcome many or all of the above-discussed shortcomings in the art.

The apparatus to recover multivolume data is provided with a plurality of modules configured to functionally execute the steps of retrieving metadata from a catalog, locating a data set, and recovering the data set. These modules in the described embodiments include a retrieval module, a location module, and a recovery module. The apparatus may also include a verification module, a backup module, and a data set size module.

In one embodiment, the backup module backs up a plurality of source volumes to a plurality of backup volumes as a physical copy of the plurality of source volumes. No metadata is captured during the back up operation. The plurality of source volumes may include a data set that is backed up to the plurality of backup volumes. In one embodiment, the data stored in the plurality of backup volumes is substantially equivalent to data stored in the plurality of source volumes.

In one embodiment, the data set size module captures a data set size for the data set as part of a physical data block by data block copy, referred to herein as a block-by-block copy, of the source volumes to the backup volumes. The data set size may comprise a data component size and an index component size for each data set. Alternatively, if the data set is stored on the plurality of source volumes as striped data, the data set size module may capture a data set stripe size for each stripe of the data set and the number of stripes for the data set.

The retrieval module retrieves metadata for the data set from a catalog. The metadata locates an instance of the data set on the plurality of source volumes. In one embodiment, the catalog is stored on a storage volume. In a certain embodiment, the catalog is stored on a source volume.

The location module locates the data set on the plurality of backup volumes using the metadata. In one embodiment, the location module locates data blocks of the data set residing on the backup volumes using physical addresses for data blocks of the data set instance residing on the source volumes.

The recovery module recovers the data set as a recovered data set from the plurality of backup volumes. In one embodiment, the recovery module copies the located data set from the plurality of backup volumes to a plurality of target volumes. In a certain embodiment, the plurality of target volumes are the plurality of source volumes.

In one embodiment, the verification module verifies that the recovered data set is successfully recovered. The verification module may verify that the data set is successfully recovered by determining that a total allocated space for the recovered set is substantially equivalent to the data set size. The apparatus recovers the data set from the plurality of backup volumes using the metadata of the catalog. In addition, the apparatus may verify that the data set is successfully recovered. In one embodiment, the apparatus may recover a plurality of data sets.

A system of the present invention is also presented to recover multivolume data. The system may be embodied in a data processing system. In particular, the system, in one embodiment, includes a plurality of source volumes, a plurality of backup volumes, a catalog, and a storage controller. The storage controller includes a retrieval module, a location module, a recovery module, and a verification module. In one embodiment, the storage controller also includes a backup module and a data set size module.

The plurality of source volumes store data sets for the data processing system. The catalog stores metadata for instances of the data sets stored on the source volumes. This metadata describes the location of the data sets on the plurality of source volumes.

The backup module backs up the data sets of the plurality of source volumes to the plurality of backup volumes. In one embodiment, the backup module physically backs up the plurality of source volumes to the plurality of backup volumes. In addition, the data set size module may capture a data set size for each data set during the physical back up.

The retrieval module retrieves the metadata for the data set from the catalog. In one embodiment, the data set spans a plurality of backup volumes. The location module locates the data set on the plurality of backup volumes using the metadata. The recovery module recovers the data set as a recovered data set from the plurality of backup volumes. The verification module verifies that the recovered data set is successfully recovered. The system recovers the data set from the plurality of backup volumes although there is no metadata specifying the location of the data set on the backup volumes.

A method of the present invention is also presented for recovering multivolume data. The method in the disclosed embodiments substantially includes the steps to carry out the functions presented above with respect to the operation of the described apparatus and system. In one embodiment, the method includes retrieving metadata from a catalog, locating a data set, and recovering the data set. The method may also include backing up the data set, capturing a data set size, and verifying that the recovered data set is successfully recovered.

In one embodiment, a backup module physically backs up a plurality of source volumes to plurality of backup volumes. A data set size module may also capture a data set size for a data set during the physical backup. A retrieval module retrieves metadata for the data set from a catalog. A location module locates the data set on the plurality of backup volumes using the metadata. A recovery module recovers the data set as a recovered data set from the plurality of backup volumes. In one embodiment, a verification module verifies that the recovered data set is successfully recovered. The method uses the catalog metadata to locate the data set and to the recover the data set from the plurality of backup volumes.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention locates a data set residing on a plurality of backup volumes without backup volume metadata to locate the data set. In addition, the embodiment of the present invention recovers the data set using metadata for an instance of the data set residing on a plurality of source volumes. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscure aspects of the invention.

Figure 1:
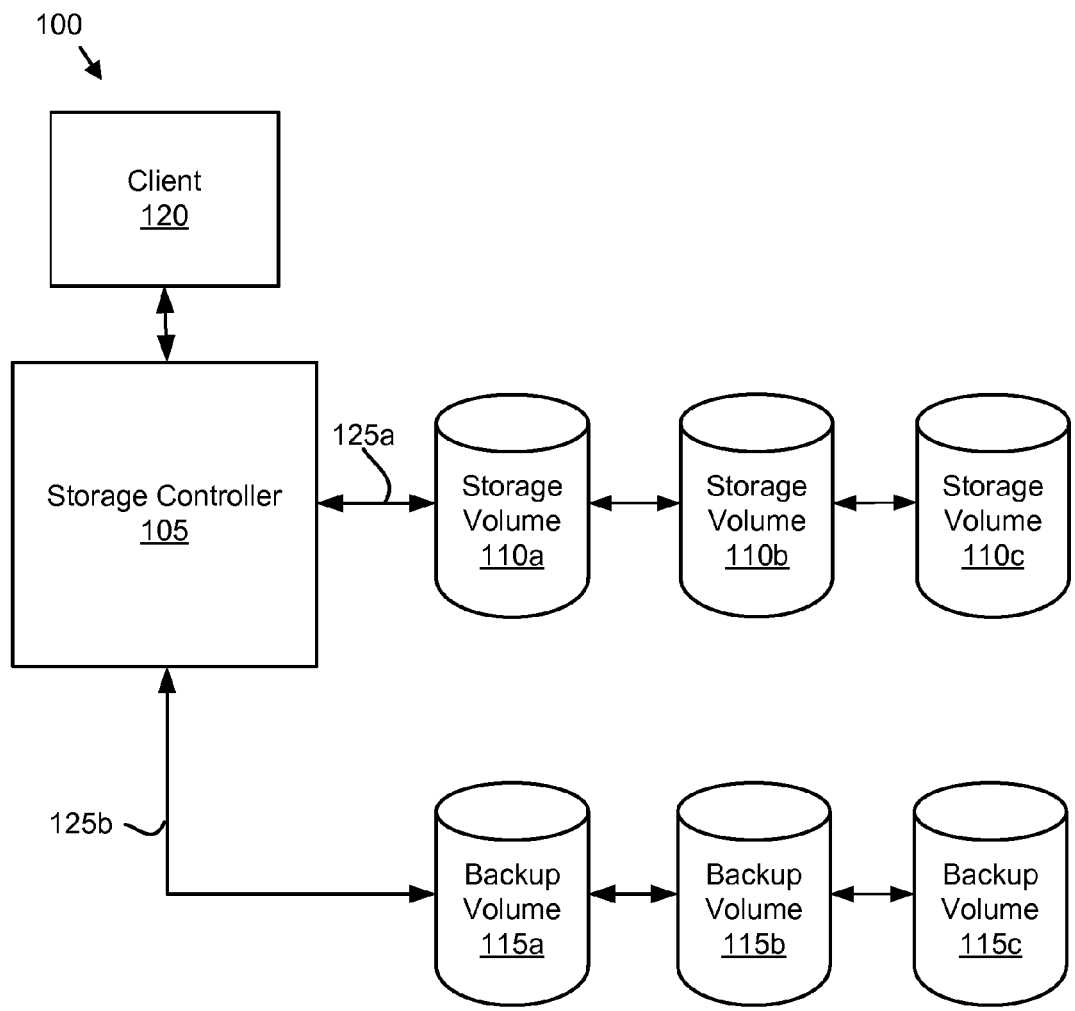
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes a client 120, a storage controller 105, one or more source volumes 110, and one or more backup volumes 115. Although for simplicity the system 100 is shown with one client 120, one storage controller 105, three source volumes 110, and three backup volumes 115, any number of clients 120, storage controllers 105, source volumes 110, and backup volumes 115 may be employed.

The source volumes 110 and the backup volumes 115 may be physical storage volumes such as redundant arrays of independent disks (RAID) storage systems, hard disk drives, magnetic tape drives, optical storage devices, micromechanical storage devices, semiconductor memory, or the like. In one embodiment, the source volumes 110 and the backup volumes 115 are physically equivalent. For example, a first source volume 110a and a first backup volume 115a may be the same model hard disk drive with equivalent sector and track organizations as is well known to those skilled in the art.

The storage controller 105 communicates with the source volumes 110 and the backup volumes 115 over communication channels 125. The communication channels 125 may be configured as Ethernet connections, Fibre Channel connections, small computer system interface (SCSI) connections, or the like. Although the source volumes 110 and backup volumes 115 are depicted as communicating with the storage controller 105 over separate communication channels 125, source volumes 110 and backup volumes 115 may communicate over one or more shared communication channels 125. Indeed, source volumes 110 and backup volumes 115 may be only logically designated as such, and otherwise may be indistinguishable.

The storage controller 105 stores data to and retrieves data from the source volumes 110 for the client 120. The data may be organized as data sets, such as files, data bases, and the like. A data set may be stored on or span one or more source volumes 110. For example, a data base data set may be stored on the first, second, and third source volumes 110a, 110b, 110c. Metadata may describe the location of each data set within the source volumes 110, as well as describe the characteristics of the data sets. The metadata may be organized in a catalog. The catalog may be stored on a storage volume.

The storage controller 105 may manage the source volumes 110. In addition, the storage controller 105 may also back up the data sets of the source volumes 110 to the backup volumes 115 in order to protect the data sets from loss should one or more of the source volumes 110 fail. In one embodiment, the storage controller 105 physically backs up the data sets of the source volumes 110 to the backup volumes 115 by copying each data block of the source volumes 110 to a corresponding data block location on the backup volumes 115. For example, storage controller 105 may copy the data blocks of a track of the first source volume 110a to an equivalent track of the first backup volume 115a, and so on, such that the corresponding tracks of the first source volume 110a and the first backup volume 115a are equivalent.

The storage controller 105 may physically back up the data sets to the backup volumes 115 without capturing metadata for the data sets. For example, the storage controller 105 may not record metadata specifying the location of the data sets on the backup volumes 115. Thus, although a data set may be backed up on the backup volumes 115, the storage controller 105 has in the past often been unable to address the backup data set, particular if the data set spanned multiple backup volumes.

Figure 2:
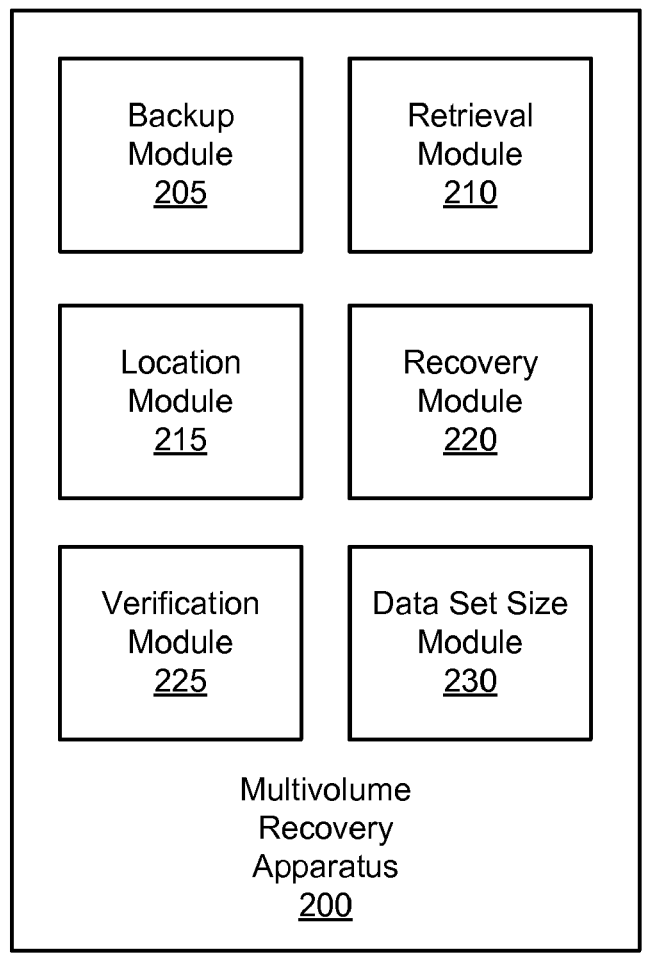
FIG. 2 is a schematic block diagram illustrating one embodiment of a multivolume recovery apparatus of the present invention.

FIG. 2 is a schematic block diagram illustrating one embodiment of a multivolume recovery apparatus 200 of the present invention. The apparatus 200 includes a backup module 205, a retrieval module 210, a location module 215, a recovery module 220, a verification module 225, and a data set size module 230. The description of the apparatus 200 refers to elements of FIG. 1, like numbers referring to like elements. The apparatus 200 may be embodied in the storage controller 105 of FIG. 1.

In one embodiment, the backup module 205 backs up the source volumes 110 to the backup volumes 115 as a physical back up of the source volumes 110 as described for FIG. 1. The backup module 205 backs up the source volumes 110 without capturing metadata.

In one embodiment, the data set size module 230 captures a data set size for the data set as part of a block-by-block copy of the source volumes 110 to the backup volumes 115. In a certain embodiment, the data set size module 230 captures a data component size and an index component size for each data set. A data set may comprise one or more data components. Each data component may store one or more records. The data component size may be a size in bytes, words, data blocks, or the like for the data components of the data set. An index component may relate each data component record's key to the record's location in the data set. The index component size may be a size in bytes, words, data blocks, or the like for index components of the data set.

Alternatively, the data set may be stored on the plurality of source volumes 110 as striped data. A stripe may be a portion of the data set stored to a source volume 110. The data set may be stored as a plurality of stripes across the plurality of source volumes 110. The data set size module 230 may capture a data set stripe size for each stripe of the data set and the number of stripes for the data set. For example, source volumes 110 organized as striped volumes may store a data set as a plurality of stripes written concurrently across two or more source volumes 110 as is well known to those skilled in the art. The data set size module 230 may capture a data set stripe size for each stripe of a data set as the backup module 205 backs up the data set as part of the block-by-block copy of the source volumes 110 to the backup volumes 115. The data set stripe size may be a size in bytes, words, data blocks, or the like of a data set stripe. In one embodiment, each data set stripe size comprises a data component size and an index component size.

The retrieval module 210 retrieves metadata for the data set from a catalog as will be described hereafter. The catalog stores metadata for instances of data sets stored on the source volumes 110. In one embodiment, the retrieval module 210 retrieves the metadata in response to a recovery request that directs that the data set be recovered or copied from the backup volumes 115 to target volumes.

The location module 215 locates the data set on the backup volumes 115 using the metadata as will be described hereafter. In one embodiment, the location module 215 locates data blocks of the data set residing on the backup volumes 115 using physical addresses for data blocks of an instance of the data set residing on the source volumes 110 from the metadata.

The recovery module 220 recovers the data set as a recovered data set from the backup volumes 115 as will be described hereafter. In one embodiment, the recovery module copies the located data set from the backup volumes 115 to a plurality of target volumes. In a certain embodiment, the plurality of target volumes are the source volumes 110.

In one embodiment, the verification module 225 verifies that the recovered data set is successfully recovered as will be described hereafter. The apparatus 200 recovers the data set from the backup volumes 115 using the metadata of the catalog. In addition, the apparatus 200 may verify that the data set is successfully recovered.

Figure 3:
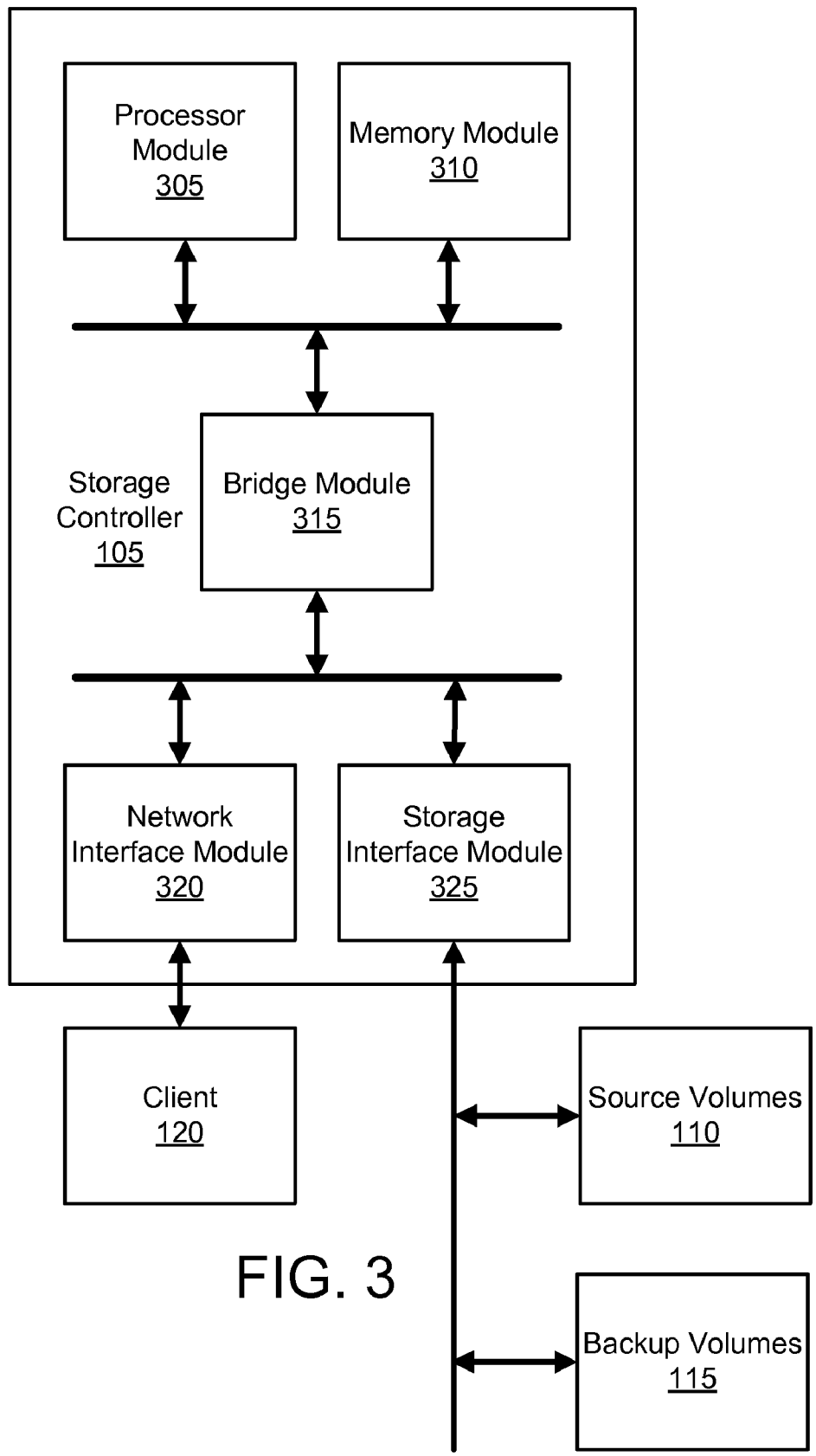
FIG. 3 is a schematic block diagram illustrating one embodiment of storage controller of the present invention.

FIG. 3 is a schematic block diagram illustrating one embodiment of storage controller 105 the present invention. The description of the controller 105 refers to elements of FIGS. 1-2, like numbers referring to like elements. The controller 105 includes a processor module 305, a memory module 310, a bridge module 315, a network interface module 320, and a storage interface module 325. In addition, the storage controller 105 is shown in communication with the client 120, the source volumes 110, and the backup volumes 115.

The processor module 305, memory module 310, bridge module 315, network interface module 320, and storage interface module 325 may be fabricated of semiconductor gates on one or more semiconductor substrates. Each semiconductor substrate may be packaged in one or more semiconductor devices mounted on circuit cards. Connections between the processor module 305, the memory module 310, the bridge module 315, the network interface module 320, and the storage interface module 325 may be through semiconductor metal layers, substrate to substrate wiring, circuit card traces, and/or wires connecting the semiconductor devices.

The memory module 310 stores software instructions and data. The processor module 305 executes the software instructions and manipulates the data as is well known to those skilled in the art. In one embodiment, the memory module 310 stores and a processor module 305 executes one or more software processes comprising the backup module 205, retrieval module 210, location module 215, recovery module 220, verification module 225, and data set size module 230.

The processor module 305 communicates with the network interface module 320 and the storage interface module 325 through the bridge module 315. In addition, the processor module 305 may communicate with the client 120 through the network interface module 320 and the storage interface module 325.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
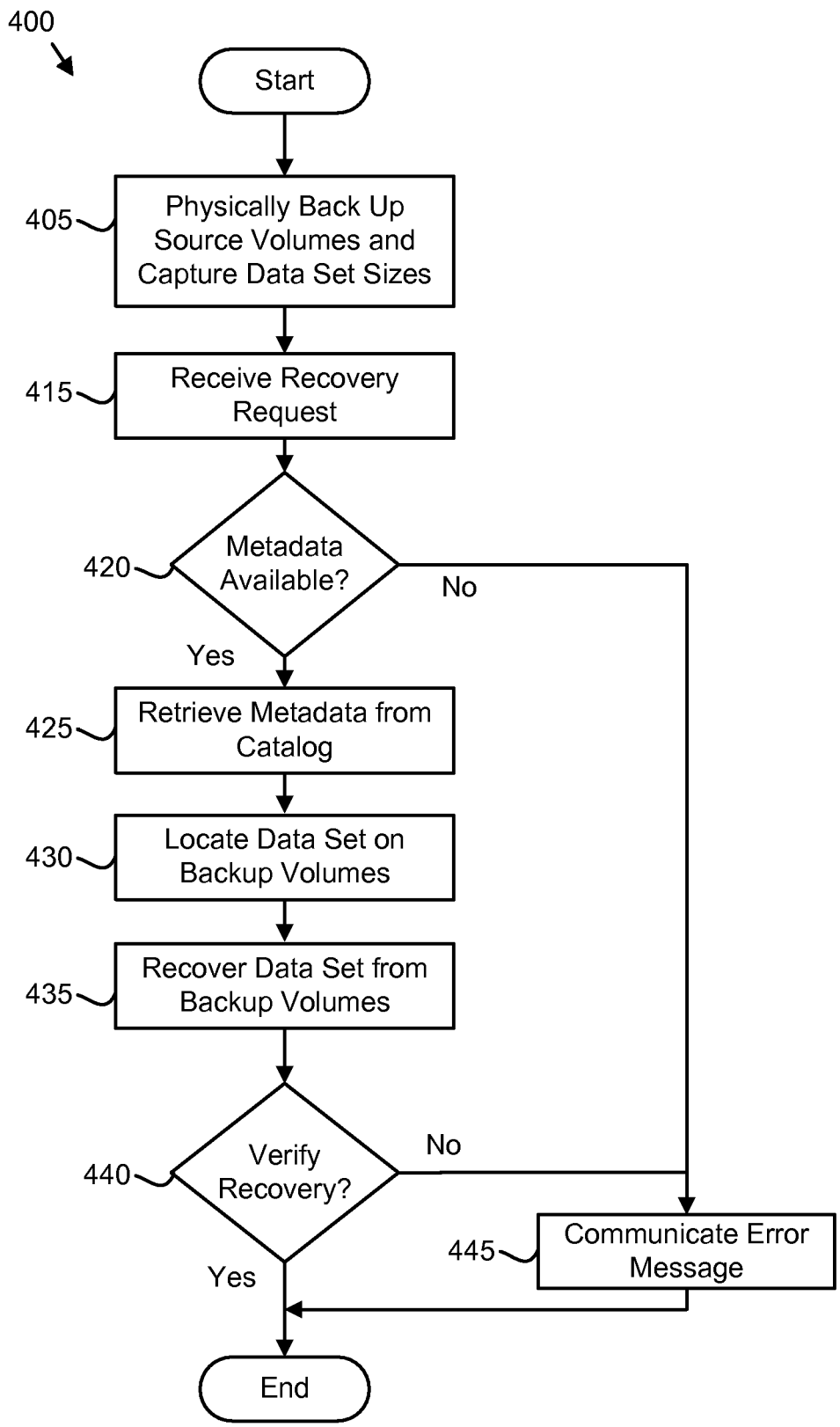
FIG. 4 is a schematic flow chart diagram illustrating one embodiment of a multivolume recovery method of the present invention.

FIG. 4 is a schematic flow chart diagram illustrating one embodiment of a multivolume recovery method 400 of the present invention; The method 400 substantially includes the steps to carry out the functions presented above with respect to the operation of the described apparatus 200, 300 and system 100 of FIGS. 1-3. The description of the method 400 refers to elements of FIGS. 1-3, like numbers referring to like elements. The method 400 is described for recovering a single data set, although the method 400 is applicable to any number of data sets.

In one embodiment, the backup module 205 physically backs up 405 the source volumes 110 to the backup volumes 115. The backup module 205 may back up 405 the source volumes 110 at a specified time. Alternatively, the backup module 205 may back up 405 the source volumes 110 as directed by an administrator. In a certain embodiment, the backup module 205 backs up 405 the source volumes 110 in response to a specified event such a write to a data set.

In one embodiment, the data set size module 230 further captures 405 a data set size for a data set that is backed up to the backup volumes 115 as part of a block-by-block physical copy of the source volumes 110 to the backup volumes 115. If the data set is stored as striped data, the data set size module 230 captures 405 a data set stripe size for each stripe of the data set. The data set size module 230 may also capture 405 the number of stripes for the data set. In one embodiment, the data set size module 230 identifies the data set as the data set is backed up to the backup volumes 115 and captures 405 the size of the identified data set. The data set module 230 may store the captured data set size with the data set on the backup volumes 115. Alternatively, the data set module 230 may store the captured data set size in the memory module 310.

In one embodiment, the retrieval module 210 receives 415 a recovery request to recover the data set from the backup volumes 115. The client 120 may communicate the recovery request to the storage module 105 and to the retrieval module 210 executing on the storage module 105. In an alternate embodiment, the storage controller 105 detects a failure and/or potential failure of one or more source volumes 110. The storage controller 105 may communicate the recovery request to the retrieval module 210 to recover the data sets affected by the failure and/or potential failure of the one or more source volumes 110.

In one embodiment, the retrieval module 210 determines 420 if the metadata for the data set is available. The retrieval module 210 may locate the catalog for instances of data sets stored on the source volumes 1 10 and search the catalog for the metadata of an instance of the data set. If the retrieval module 210 determines 420 that the metadata is not available, the retrieval module 210 communicates 445 an error message and the method 400 terminates. In a certain embodiment, the retrieval module 210 communicates 445 the error message to the client 120. Alternatively, the retrieval module 210 communicates 445 the error message to an administrator.

If the retrieval module 210 determines 420 that the metadata for the data set is available, the retrieval module 210 retrieves 425 the metadata for the data set from the catalog. In one embodiment, the recovery request identifies the instance of the data set stored on the source volumes 110 using an identifier such as a name, a logical address, or the like. Alternatively, the identifier may identify the data set stored on the backup volumes 115. The retrieval module 210 may employ the identifier to retrieve 425 the metadata from the catalog.

The location module 215 locates 430 the data set on the backup volumes 115 using the metadata. In a certain embodiment, the retrieved metadata includes location data that locates the data set on the source volumes 110. The location data may specify the location of the instance of the data set on the source volumes 110. For example, the location data may include physical addresses for the instance of the data set on one or more of the source volumes 110. The location module 215 may locate 430 the instance of the data set on the backup volumes 115 by parsing out a portion of the physical address that locates the instance of the data set on a source volume 110. For example, the location module 215 may parse a sector and track address for a first data block of the instance of the data set residing on the first source volume 110a.

The location module 215 may further append an address for a corresponding backup volume 115 to the parsed physical address to form the address of the instance of the data set on the backup volumes 110. Continuing the example above, the location module 215 may append a physical address identifier for the first backup volume 110a to the sector and track address for the first data block of the instance of the data set on the first source volume 110a to form an address of a first data block residing on the first backup volume 115a, wherein the first backup volume 115a corresponds to the first source volume 110a. The address may locate the data set on the backup volumes 115.

In one embodiment, the location module 215 locates 430 the data set by forming a plurality of addresses for the data set. For example, the location module 215 may form a start address and an end address delimiting a portion of the data set on a backup volume 115. In addition, the location module 215 may form a plurality of start and end address pairs. The start and end address pairs may address portions of the data set residing on one or more of the backup volumes 115. In a certain embodiment, the start and end address pairs each specify a stripe of the data set.

The recovery module 220 recovers 435 the data set as a recovered data set from the backup volumes 115. In one embodiment, the recovery module 220 copies data blocks specified by the one or more start and end address pairs to one or more target volumes. The target volumes may be the source volumes 110. Alternatively, the target volumes may reside on the client 120. In one embodiment, the recovery module 220 captures and stores metadata for the recovered data set. The recovery module 220 may include metadata from the catalog for the source volume instance of the data set and/or size and location data captured during the copy to create the metadata.

In one embodiment, a verification module 225 verifies 440 that the recovered data set is successfully recovered and the method 400 terminates. In a certain embodiment, the verification module 225 determines a total allocated space for the recovered data set. In one embodiment, the total allocated space is storage space allocated to receive the recovered data set. In an alternate embodiment, the total allocated space is storage space occupied by the recovered data set. The verification module 225 may determine the total allocated space as a total number of bytes, words, and/or data blocks used to store the recovered data set on the target volumes. In one embodiment, the verification module 225 verifies 440 that the data set is successfully recovered if the data set size of the data set as captured 405 by the data set size module 230 is substantially equivalent to the total allocated space.

In one embodiment, the total allocated space for the recovered data set comprises a data component size and an index component size. The verification module 225 may verify 440 that the data set is successfully recovered if a sum of the data set data component sizes for the backup volumes is substantially equivalent to the total allocated space data component size and if a sum of the data set index component sizes for the backup volumes is substantially equivalent to the total allocated space index component size.

In one embodiment, the verification module 225 captures a total allocated space for each stripe if the data set is stored as striped data on the source volumes 110. The verification module 225 may verify 440 that the data set is successfully recovered if the total allocated space for each stripe of the recovered data set is substantially equivalent to each corresponding data set stripe size and if the total number of recovered stripes is substantially equivalent to the number of stripes of the data set.

In one embodiment, the verification module 225 captures a total allocated space for the data set during a block-by-block copy. The verification module 225 may verify 440 that the data set is successfully recovered if the total allocated space for the recovered data set is substantially equivalent to the total allocated space for the data set at the time of the backup operation. In addition, the verification module 225 may verify 440 that the data set is successfully recovered even if not all source volumes 110 that the data set is cataloged to at the time of the recovery 435 contained back up data for the data set. For example, if one or more data blocks are added to the instance of the data set residing on the source volumes 110 after the backup module 210 backs up 405 the data set to the backup volumes, the verification module 225 may verify 440 that the data set is successfully recovered if the data size for the recovered data set is substantially equivalent to the total allocated space for the data set when the data set is backed up 405.

In one embodiment, the verification module 225 verifies 440 that the data set is successfully recovered if each volume of a volume sequence for the data set is recovered, that a first volume of the volume sequence is recovered, and that a volume with a highest volume sequence number has a last volume indicator set. For example, the volume sequence may include the first, second, and third source volumes 110a, 110b, 110c. The first, second, and third source volumes 110a, 110b, 110c are copied in a block-by-block copy to the backup volumes 115a, 115b, 115c. The third source volume 110c may include a last volume indicator configured as a data word in a data field, a data flag, or the like of the third source volume 110c that is copied to the third backup volume 115c as part of the block-by-block copy. The first backup volume 115a is a first volume of the volume sequence and the third backup volume 115c is a last volume of the volume sequence. The recovery module 220 may recover 435 portions of the data set from the first, second, and third backup volumes 115a, 115b, 115c. The verification module 225 may verify 440 that the data set is successfully recovered because the first, second, and third backup volumes 115a, 115b, 115c are recovered, the first backup volume 115a is recovered, the volume sequences are contiguous, and at least one recovered volume has the last volume indicator set.

If the verification module 225 does not verify 440 that the data set is successfully recovered, the retrieval module 210 communicates 445 an error message and the method 400 terminates. The retrieval module 210 may communicate 445 the error message to the client 120, the storage controller 105, and/or the administrator. The method 400 uses the catalog metadata to locate 430 the data set and to recover 435 the data set from the backup volumes 115.

Figure 5:
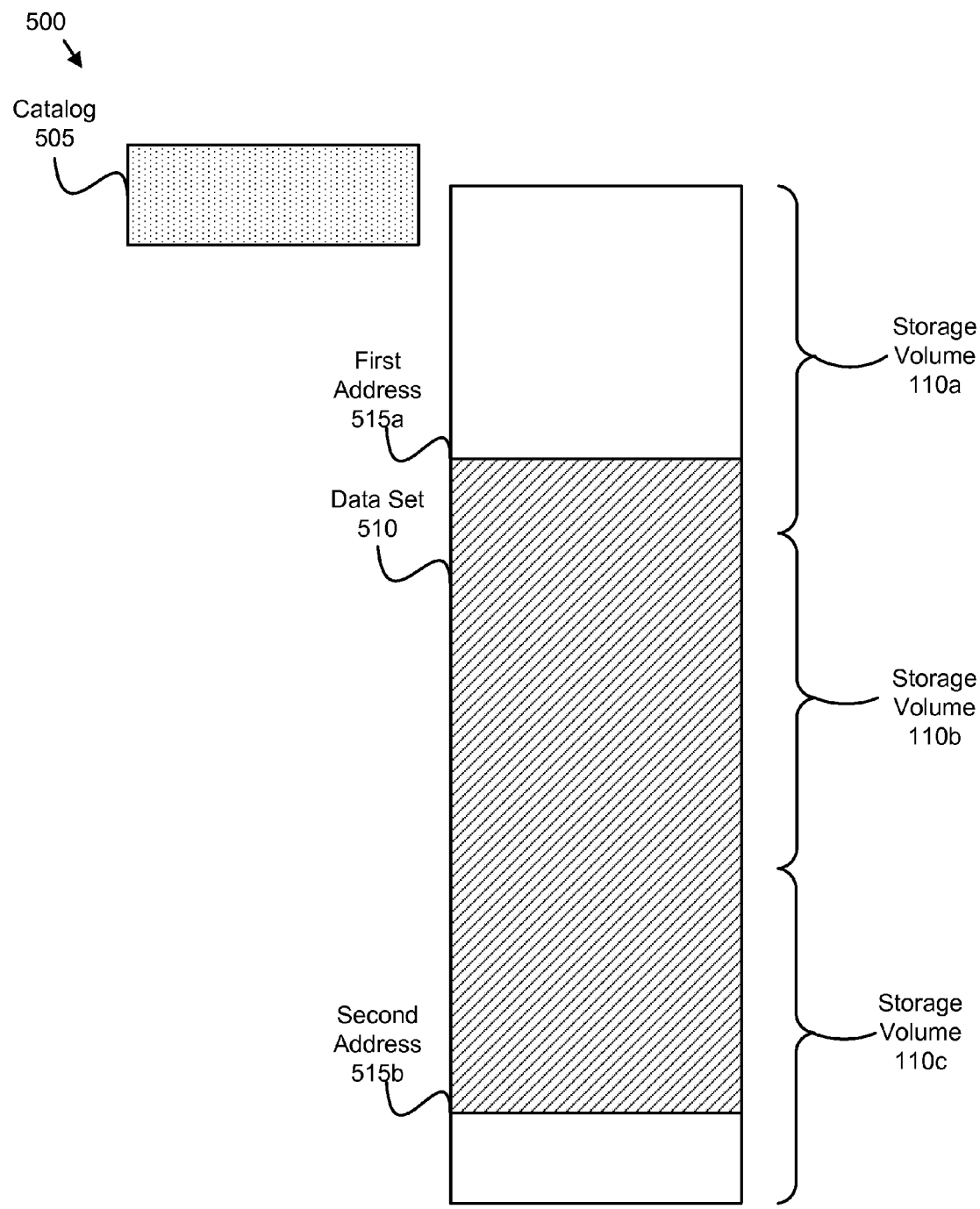
FIG. 5 is a schematic block diagram illustrating one embodiment of storage volumes of the present invention.

FIG. 5 is a schematic block diagram illustrating one embodiment of storage volumes 500 of the present invention. The description of the volumes 500 refers to elements of FIGS. 1-4, like numbers referring to like elements. The source volumes 110 of FIG. 1 are shown as memory maps. The catalog 505 is also depicted. The catalog 505 may be stored in the memory module 310 of the storage controller 105.

The data set 510 is shown as stored on the first, second, and third source volume 110a, 110b, 110c. The catalog 505 includes metadata that may specify the locations of the data set 510 on the source volumes 110. The metadata may include a first address 515a and a second address 515b wherein the addresses 515 specify the location of the data set 510 on the source volumes 110. Although for simplicity two addresses 515 specify the location of the data set 510, any number of addresses 515 may be employed.

Figure 6:
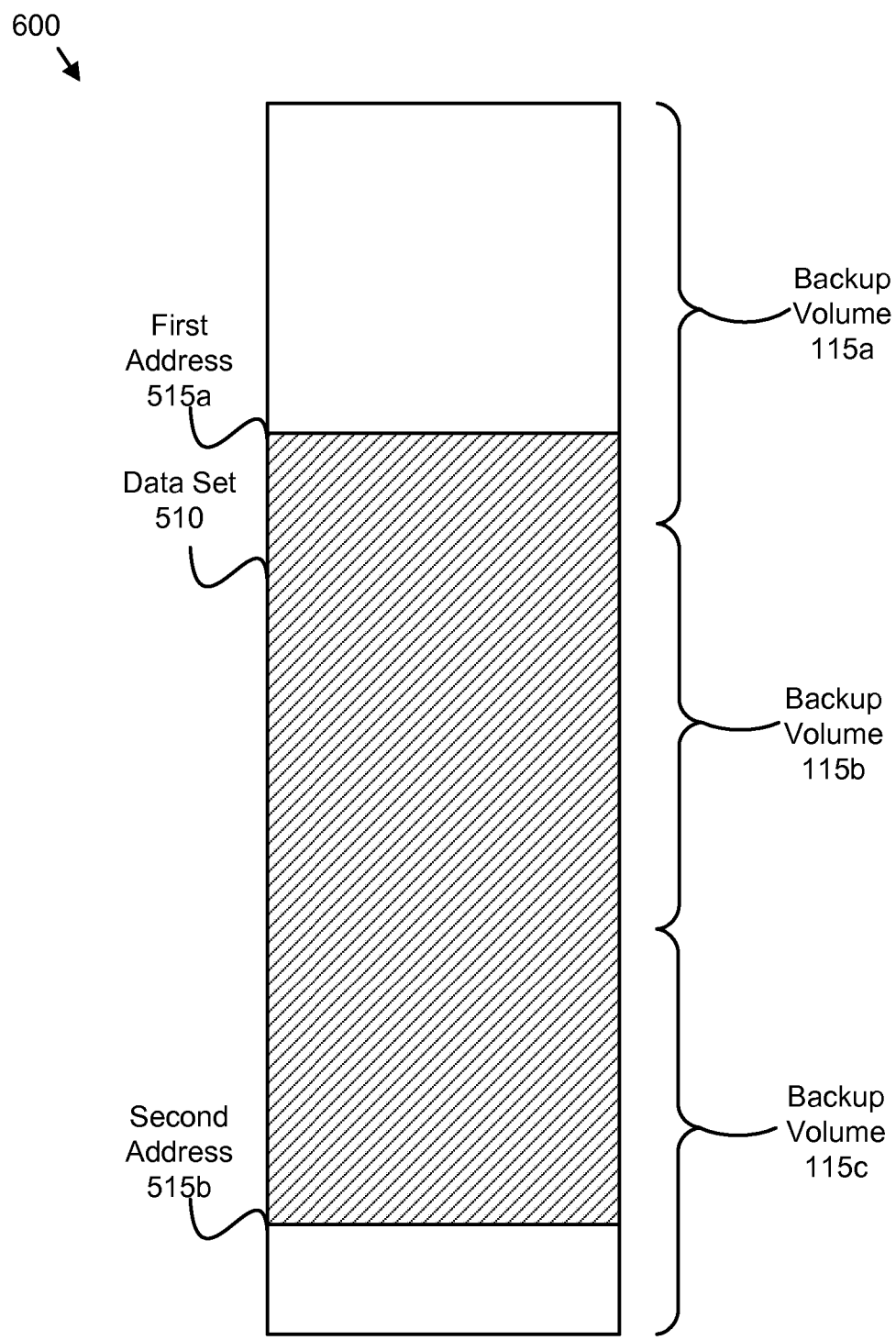
FIG. 6 is a schematic block diagram illustrating one embodiment of backup volumes of the present invention.

FIG. 6 is a schematic block diagram illustrating one embodiment of backup volumes 600 of the present invention. The description of the volumes 600 refers to elements of FIGS. 1-5, like numbers referring to like elements. The backup volumes 115 of FIG. 1 are shown as memory maps. In addition, the data set 510 is shown as copied to the backup volumes 115 as a physical copy of the source volumes 110 of FIG. 5. Thus the first and second address 515a, 515b of FIG. 5 also locate the instance of the data set 510 residing on the backup volumes 115. The location module 215 may employ the addresses 515 to locate 430 the data set 510, allowing the recovery module 220 to recover 435 the data set 510 to a plurality of target volumes.

The embodiment of the present invention locates 430 a data set 510 residing on a plurality of backup volumes 115 without backup volume metadata to locate the data set 510. In addition, the embodiment of the present invention recovers 435 the data set 510 using metadata for the instance of the data set 510 stored on the source volumes 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to recover multivolume data, the apparatus comprising:
 a storage device storing executable code;
 a processor executing the executable code, the executable code comprising
  a backup module physically backing up a plurality of source volumes to a plurality of backup volumes, the plurality of source volumes comprising a data set, wherein source volume metadata specifying a location for the data set on the plurality of source volumes is stored in a catalog and no backup volume metadata locates a backup copy of the data set on the plurality of backup volumes;
  a retrieval module retrieving the source volume metadata for the data set from the catalog;
  a location module locating the backup copy of the data set on the plurality of backup volumes using the source volume metadata; and
  a recovery module recovering the data set as a recovered data set from the backup copy of the data set on the plurality of backup volumes.

2. The apparatus of claim 1, the executable code further comprising a verification module verifying that the recovered data set is successfully recovered.

3. The apparatus of claim 2, the executable code further comprising a data set size module capturing a data set size for the data set during the physical backup.

4. The apparatus of claim 3, wherein the verification module is further configured to verify that the data set is successfully recovered by determining that a total allocated space for the recovered data set is substantially equivalent to the data set size.

5. The apparatus of claim 3, wherein the data size comprises a data component size and an index component size for each backup volume, the total allocated space for the recovered data set comprises a data component size and an index component size, and the verification module verifies that the data set is successfully recovered by determining that a sum of the data set data component sizes for the backup volumes is substantially equivalent to the total allocated space data component size and that a sum of the data set index component sizes for the backup volumes is substantially equivalent to the total allocated space index component size.

6. The application of claim 3, wherein the data set instance is stored on the plurality of source volumes as a plurality of stripes and wherein the data set size module is configured to capture a data set stripe size for each stripe of the data set and a number of stripes for the data set during the physical backup and the verification module verifies that the data set is successfully recovered by determining that a total allocated space for each stripe of the recovered data set is substantially equivalent to each corresponding data set stripe size and a number of recovered stripes is substantially equivalent to the number of stripes for the data set.

7. A computer useable medium storing a computer readable program, wherein the computer readable program when executed on a computer causes the computer to:
 physically back up a plurality of source volumes to a plurality of backup volumes, the plurality of source volumes comprising a data set, wherein source volume metadata specifying a location for the data set on the plurality of source volumes is stored in a catalog and no backup volume metadata locates a backup copy of the data set on the plurality of backup volumes;
 retrieve the source volume metadata for the data set from the catalog;
 locate the backup copy of the data set on the plurality of backup volumes using the source volume metadata; and
 recover the data set as a recovered data set from the backup copy of the data set on the plurality of backup volumes.

8. The computer useable medium of claim 7, wherein the computer readable code further causes the computer to verify that the recovered data set is successfully recovered.

9. The computer useable medium of claim 8, wherein the computer readable code further causes the computer to physically back up the plurality of source volumes to the plurality of backup volumes by copying each data block of the plurality of source volumes to a corresponding data block location on the plurality of backup volumes.

10. The computer useable medium of claim 9, wherein the computer readable code further causes the computer to capture a data set size for the data set during the physical backup.

11. The computer useable medium of claim 10, wherein the computer readable code further causes the computer to verify that the data set is successfully recovered by determining that a total allocated space for the recovered data set is substantially equivalent to the data set size.

12. The computer useable medium of claim 10, wherein the data size comprises a data component size and an index component size for each backup volume and the total allocated space for the recovered data set comprises a data component size and an index component size and the computer readable code is further configured to cause the computer to verify that the data set is successfully recovered by determining that a sum of the data set data component sizes for the backup volumes is substantially equivalent to the total allocated space data component size and that a sum of the data set index component sizes for the backup volumes is substantially equivalent to the total allocated space index component size.

13. The computer useable medium of claim 8, wherein the data set is stored on the plurality of source volumes as a plurality of stripes and wherein the computer readable code is further configured to cause the computer to capture a data set stripe size for each stripe of the data set and a number of stripes for the data set during the physical backup and to verify that the data set is successfully recovered by determining that a total allocated space for each stripe of the recovered data set is substantially equivalent to each corresponding data set stripe size and a number of recovered stripes is substantially equivalent to the number of stripes for the data set.

14. The computer useable medium of claim 8, wherein the computer readable code further causes the computer to verify that the data set is successfully recovered by determining that a total allocated space for the recovered data set is substantially equivalent to a total allocated space for the data set at the time of the backup operation, even if not all of the source volumes that the data set is cataloged to at the time of the recovery contained backup data for the data set.

15. The computer useable medium of claim 8, wherein the computer readable code further causes the computer to verify that the data set is successfully recovered by determining that each volume of a volume sequence for the data set is recovered, that a first volume of the volume sequence is recovered, that the volume sequences are contiguous, and that at least one volume has a last volume indicator set.

16. A system to recover a multivolume data set, the system comprising:
a plurality of source volumes configured to store an instance of a data set;
a plurality of backup volumes configured to store a backup copy the data set;
a catalog configured to store source volume metadata specifying a location for the data set stored on the plurality of source volumes;
a storage controller configured to manage the plurality of source volumes, the plurality of backup volumes, and the catalog, and comprising a storage device storing executable code and a processor executing the executable code, the executable code comprising
a backup module physically backing up the plurality of source volumes to the plurality of backup volumes, wherein no backup volume metadata locates the backup copy of the data set on the plurality of backup volumes;
a retrieval module retrieving the source volume metadata for the data set from the catalog;
a location module locating the backup copy of the data set on the plurality of backup volumes using the source volume metadata;
a recovery module recovering the data set as a recovered data set from the backup copy of the data set on the plurality of backup volumes; and
a verification module verifying that the recovered data set is successfully recovered.

17. The system of claim 16, the executable code further comprising a data set size module capturing a data set size for the data set during the physical backup.

18. The system of claim 17, wherein the verification module verifies that the data set is successfully recovered by determining that a total allocated space for the recovered data set is substantially equivalent to the data set size.

19. A method for deploying computer infrastructure, comprising integrating computer-readable code into a computing system, wherein the code executed by the computing system performs the following:
physically backing up a plurality of source volumes to a plurality of backup volumes, the plurality of source volumes comprising a data set, wherein source volume metadata specifying a location for the data set on the plurality of source volumes is stored in a catalog and no backup volume metadata locates a backup copy of the data set on the plurality of backup volumes;
capturing a data set size for the data set instance during the physical backup;
retrieving the source volume metadata for the data set from the catalog;
locating the backup copy of the data set on the plurality of backup volumes using the source volume metadata;
recovering the data set as a recovered data set from the backup copy of the data set on the plurality of backup volumes; and
verifying that the recovered data set is successfully recovered.

20. The apparatus of claim 1, wherein the backup module physically backs up the plurality of source volumes to the plurality of backup volumes by copying each data block of the plurality of source volumes to a corresponding data block location on the plurality of backup volumes.

* * * * *